Patented Aug. 4, 1953

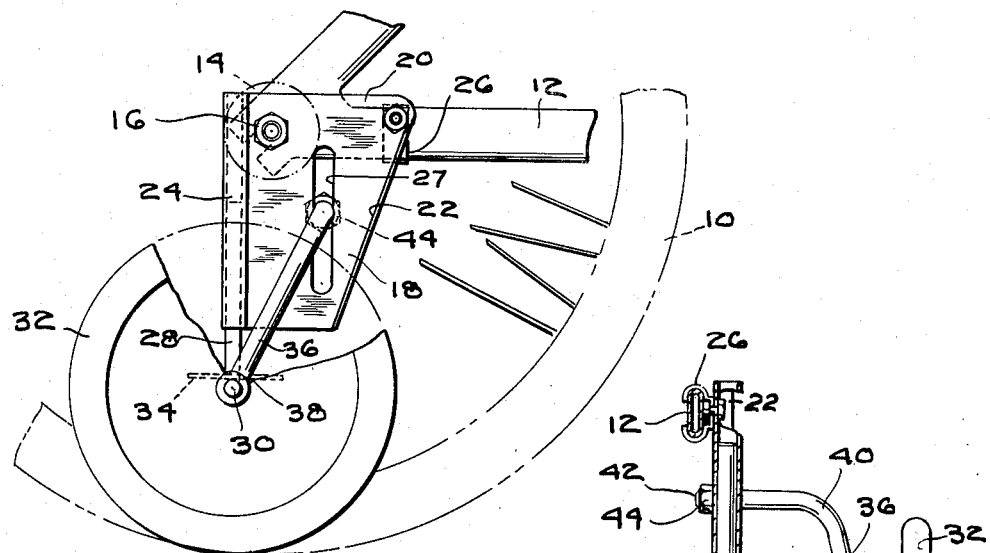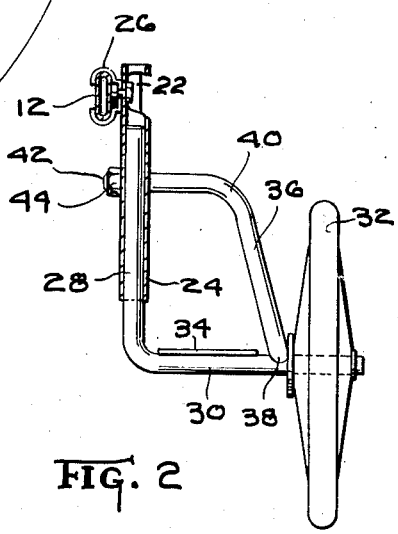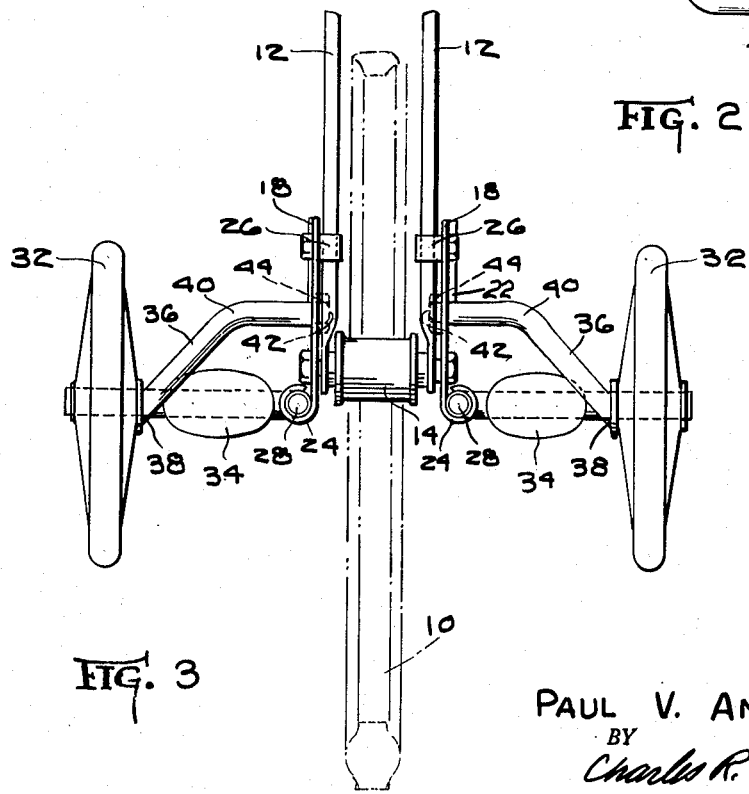

2,647,764

UNITED STATES PATENT OFFICE 2,647,764

STABILIZING WHEEL ATTACHMENT FOR BICYCLES

Paul V. Anderson, Gardner, Mass.

Application November 17, 1951, Serial No. 256,889

6 Claims. (Cl. 280—293)

1

This invention relates to a new and improved stabilizer for two-wheeled vehicles such as bicycles and the principal object of the invention resides in the provision of a stronger device of the class described having a positive and easily operated adjustment for accommodating different sizes of bicycles and to adjust the stabilizing wheel after it has been initially set in devices where the rider of the bicycle shows improvement in riding but still requires lateral support in mounting the bicycle.

Further objects of the invention reside in the provision of a strong rigid plate having means for attachment to a bicycle flange or hub and including a vertical tube-like guide and a spaced parallel slot, said guide receiving the turned up end of a rod which has a horizontal axle portion supporting a small wheel that acts as the stabilizer in spaced relation to the plate, and including a foot support or rest with an outboard brace secured to the horizontal part of the rod near the small wheel, said brace extending forwardly and upwardly and then inwardly to enter the slot, and including means securing the same therein in vertically adjusted position with respect thereto.

Other objects and advantages of the invention will appear hereafter.

Reference is to be had to the accompanying drawings in which

Fig. 1 is a view in side elevation of a device according to the invention;

Fig. 2 is a rear elevation thereof, part being in section; and

Fig. 3 is a top plan view.

As herein disclosed, there is shown but a single stabilizer, but it is to be understood that usually there will be one such device at each side of the bicycle, the rear wheel of which is indicated in dotted lines at 10. The rear wheel is provided with a bar 12 to which the kick stand may be secured and the hub of the bicycle is generally indicated at 14. The hub has a shaft or axle on which is mounted the usual nut or the like 16.

The present invention comprises a plate 18 in a generally triangular form with the base of the triangle uppermost as at 20, and having an inclined and flanged leading edge 22. At the rear edge the plate is bent around to form a vertical tube or guide as shown in 24. There is a pair of space holes in the plate. One of these holes receives the axle of the wheel hub and is secured thereto by the nut 16, while the other hole is used to secure a clip 26 on the bar 12. The plate 18 also has a vertical slot 27 which is spaced from and parallel to the guide tube 24.

2

The tube 24 receives in a vertically slidable fashion the turned up end 28 of horizontal rod 30, the latter providing an axle for the small wheel 32 which may be secured by means of a cotter pin or the like. The wheel 32 is spaced from the turned up end part 28 and this part of the device carries a platform for the foot at 34. Since there is a device at each side of the bicycle wheel 10, the bicycle may be used as a coaster with the operator standing on the two platforms 34.

A brace generally indicated at 36 is secured at 38 to the horizontal part of the rod 30 which is inside the wheel 32. This brace extends forwardly and upwardly, see Fig. 1, to a point approximately at 40, where it turns inwardly toward the plate 18 and is provided with a necked down threaded portion 42 which extends through the slot 27 and receives a nut 44 securing the same in adjusted position. Washers of a known type may be used.

Once the device is in place, it is very easy to adjust the same merely by loosening the nut 44 and moving the entire rigid frame 28, 30, and 36 vertically. It is clear that the present stabilizer is relatively sturdy and yet simple in operation and application.

Having thus described my invention and the advantages thereof, I do not wish to be limited to the details herein disclosed otherwise than as set forth in the claims, but what I claim is:

1. A wheel attachment for a bicycle comprising a plate for securement to a wheel hub or the like of the bicycle, a tubular guide on the plate, a rod slidable in the guide, an axle on the rod extending at an angle to the rod, and a wheel on the axle, a brace secured to the axle in spaced relation to the rod, said brace extending upwardly and forwardly relative to the bicycle, means to adjustably secure the brace to the plate, said means including a slot in the plate and means causing a clamping effect on the brace extending through the slot.

2. The wheel attachment of claim 1 wherein the line of adjustment of the brace is parallel to the guide.

3. A stabilizer for a vehicle comprising a plate, means for attaching the plate to the vehicle, a guide on the plate, a slot in the plate parallel to the guide, a rod having an angled end slidable in the guide and an end extending at an angle to the plate, a brace on the extending end of the rod in spaced relation to the plate, said brace extending upwards and toward the slot at an incline relative to the guide, means on the brace adjustably received in the slot, and means to secure the brace in adjusted relation, the rod and brace being slidably adjustable relative to the plate and to the vehicle, and vehicle supporting means on the extending end of the rod in spaced relation to the plate.

4. The stabilizer of claim 3 including a foot rest plate on the extending end of the rod at the side of the brace toward the plate.

5. The stabilizer of claim 3 wherein the guide is a tube and the brace comprises a bent rod.

6. The stabilizer of claim 3 wherein the plate is generally triangular with the base uppermost and the narrow end down.

PAUL V. ANDERSON.

References Cited in the file of this patent

UNITED STATES PATENTS

| Number | Name | Date |
| --- | --- | --- |
| 2,527,431 | Kutil | Oct. 24, 1950 |
| 2,601,994 | Richman | July 1, 1952 |